United States Patent [19]

Hunt et al.

[11] 4,224,266

[45] Sep. 23, 1980

[54] MANUFACTURE OF DETERGENT BARS

[75] Inventors: Leslie Hunt, Wirral; Ian T. Nicolson, Birkenhead; Thomas M. Whitfield, Wirral, all of England

[73] Assignee: Lever Brothers Company, New York, N.Y.

[21] Appl. No.: 943,599

[22] Filed: Sep. 18, 1978

[30] Foreign Application Priority Data

Sep. 26, 1977 [GB] United Kingdom ............... 39975/77

[51] Int. Cl.³ ................................................ B29F 3/12

[52] U.S. Cl. ...................................... 264/75; 252/134; 264/148; 425/131.1; 264/192 R; 425/463; 264/325; 425/192 R

[58] Field of Search ................. 264/171, 148, 75, 325, 264/245; 425/131.1, 192, 462–463; 252/109, 134

[56] References Cited

U.S. PATENT DOCUMENTS

| | | | |
|---|---|---|---|
| 3,779,676 | 12/1973 | Bernard | 425/192 |
| 3,884,605 | 5/1975 | Grelon | 425/199 |
| 3,890,419 | 6/1975 | Kaniecki | 264/171 |
| 3,947,200 | 3/1976 | Fischer | 425/131.1 |
| 4,096,221 | 6/1978 | Fischer et al. | 264/75 |

FOREIGN PATENT DOCUMENTS 1387567 3/1975 United Kingdom .

*Primary Examiner*—Jeffery R. Thurlow

[57] ABSTRACT

The manufacture of detergent bars having liquid, for example a colored liquid, injected into the mass is described in UK Pat. No. 1387567. The present invention describes manufacture using a single screw plodder providing two streams of extruded detergent material for cutting and stamping. A partition is provided in the extrusion cone to provide improved quality of external striping.

11 Claims, 4 Drawing Figures

MANUFACTURE OF DETERGENT BARS

This invention relates to apparatus and methods for the injection of liquids into a detergent mass for the formation of detergent bars.

In UK Pat. No. 1,387,567 the applicants describe and claim a method of injecting a liquid into a detergent mass which method may be used to manufacture striped detergent bars. The present invention is a modification of the process described and allows a single screw extruder to extrude two streams of striped detergent material for subsequent processing into detergent tablets. A single screw extruder can produce two streams by the use of a final extrusion plate having two extrusion apertures. The use of such a plate does not provide equal quality of striping around the surfaces of the two streams.

The present invention proposes a method of injecting liquid into a detergent mass wherein a detergent mass is passed through a single screw extruder and an apertured pressure plate into a common extrusion cone and liquid is injected within or immediately downstream of the apertured plate characterised in that a partition is provided extending downstream from the pressure plate to separate the detergent mass into two streams into each of which liquid is injected.

Without the partition the detergent mass is divided into two streams only when the mass passes the extrusion plate.

Preferably the partition extends to and contacts the final extrusion plate; if the partition does not contact the extrusion plant the two streams contact and reduce the quality of the external striping. However in this latter configuration the external striping is of better standard than if no partition is used. Preferably the partition has substantially cylindrical concave sides so that each stream passes along a cone space, but it may be of substantially flat section. Preferably the liquid contrasts in visual appearance with the detergent mass so that the striping is apparent to the eye. The two streams are extruded at substantially the same velocity and pairs of billets of equal length can be formed by a single knife. The invention also provides detergent processing apparatus suitable for the injection of liquid into a detergent mass comprising a single screw extruder, a common extrusion cone into which the extruder opens, apertured pressure plate areas between the extruder and the extrusion cone, liquid injection means positioned within or immediately downstream of the apertured plate areas and a partition extending downstream from the unapertured area between the apertured pressure plate areas, the side surfaces on the partition forming, together with the inner surfaces of the extrusion cone, separate compression volumes for each detergent stream.

Figure 1:
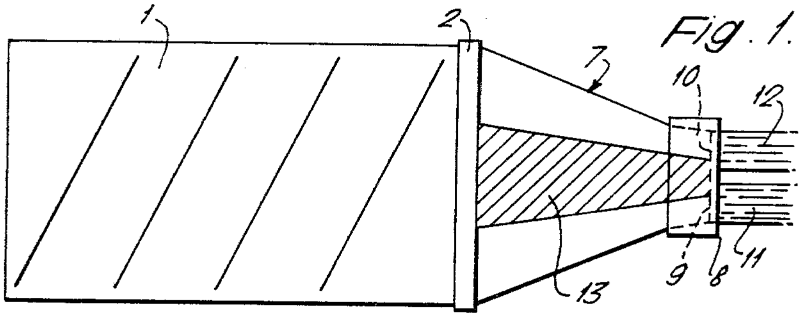
Figure 2:
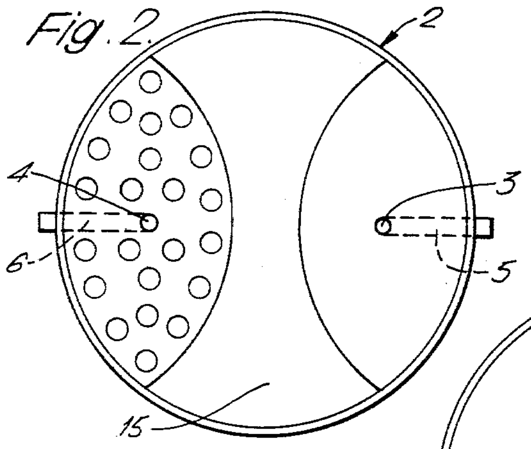
Figure 3:
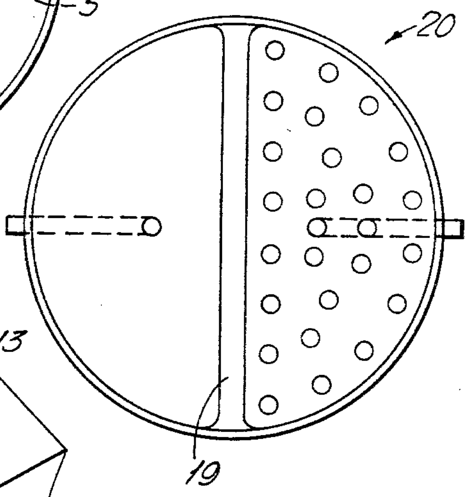
Figure 4:
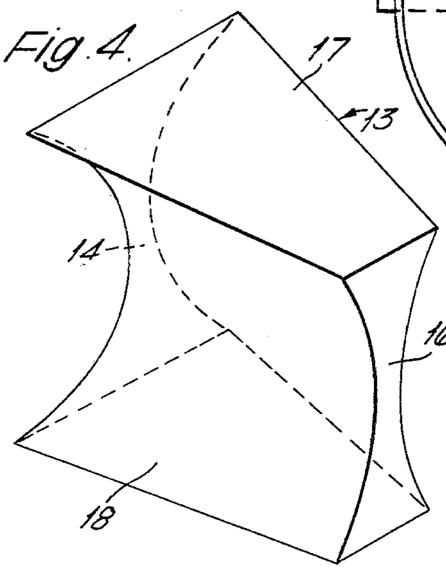

An embodiment of the apparatus and an example of the method of the invention will now be described with reference to the accompanying diagrammatic drawings in which:

FIG. 1 shows a plan view of part of a single screw plodder with the upper surface of the plodder extruder and compression cone removed to show the interior arrangements, FIG. 2 is an end view of one embodiment of the multi-apertured liquid injection plate viewed from the downstream side, FIG. 3 is a second embodiment of the injection plate, and FIG. 4 is an isometric view of the partition.

In FIG. 1 screw extruder 1 extrudes detergent material through multi-apertured plate 2. This plate carries injection points 3, 4 positioned within apertured areas. (The apertures in one area are not shown). Plate 2 has about 30 apertures each of about 35 mm diameter. The injection points are supplied with liquid under pressure through conduits 5, 6 respectively. More than one injection point may be present for each apertured area. The detergent mass is formed into rods by passage through the apertured plate and passes through an extrusion (compression) cone 7 which terminates at a twin apertured extrusion plate 8. Plate 8 has apertures 9, 10 through which continuous detergent masses 11, 12 are extruded. When a liquid with a colour contrasting to the base detergent material is injected through point 3, 4 the detergent masses 11, 12 have a striped or marbled appearance.

A partition 13 is positioned adjacent the downstream face of the multi-apertured plate 2. The partition comprises an upstream face 14 which abuts non-apertured area 15 of the multi-apertured plate. The partition 13 comprises in addition to the upstream face 14 a downstream face 16 which has a shape similar to 14 but of smaller dimensions. The upper face 17 and a corresponding bottom surface abut the inner top and bottom surfaces of the compression cone. Side surface 18 and a corresponding surface on the other side of the partition are curved in substantially cylindrical cone form to ensure the bundles of rods extruded through apertures of the multi-apertured plate 2 are separately subjected to inward pressures while moving between the apertured plate 2 and the extrusion plate. Surfaces 18 are shaped so that each detergent stream passes through a separate compression volume. Downstream surface 16 abuts plate 8 between aperature 9, 10. Between surface 16 and plate 8 there may be positioned an insert, the section of which is not a continuation of the section of the partition. Some deviation from the substantially cylindrical cone surfaces can be tolerated without affecting the functioning of the partition.

When a detergent mass is extruded through the apertures on each of the areas in plate 3 bundles of rods are formed and as these bundles are compressed inwardly the liquid injected through injection points 3, 4 distributed substantially uniformly throughout the bundle. An optional feature is the presence in the extrusion cone of a multi-apertured plate in each extrusion stream positioned between plates 2 and 8. Passage of the detergent streams through these plates improves the quality of striping.

Normally the worm in the screw extruder will terminate immediately adjacent the upstream face of plate 2. This termination may be modified so that the screw is spaced a sufficient distance from the plate to give a more equal pressure distribution over the plate surface.

A second embodiment of the apertured plate and partition is shown in FIG. 3. The partition is formed with substantially flat side surfaces and abuts a non apertured area 19 on the multi-apertured plate 20. In this embodiment the apertured areas of plate 20 are semicircular in area (the apertures in one area are not shown).

A white soap base comprising sodium salts of tallow and coconut fatty acids was extruded through apertured plate 2 and a liquid containing suspended blue dye injected through points 3, 4 of the embodiment of FIG. 2. The dye liquid had a composition in percentages by weight, of water 9.5%, glycerine 83%, sodium carboxymethyl cellulose 1.5%, Monastral Blue BVS Paste 2%, Ansteads Green 11125.4%. Monastral is a Registered Trade Mark. The amount of liquid injected was 500 grams per 100 kilogrammes of soap and the extruded mass which had a blue stripping was cut into billets and stamped to form bars.

The external striping of each extended stream was consistent around the stream; this follows from the streams being maintained separate after the liquid injection position.

What we claim is:

1. A method of injecting liquid into a detergent mass wherein a detergent mass is passed through a single screw extruder and apertured areas of apertured pressure plate means, carrying a non-apertured area between the apertured areas, into a common extrusion cone which terminates at a twin apertured extrusion plate and liquid is injected within or immediately downstream of each of the apertured areas, characterised in that a partition is provided extending downstream from the unapertured area to separate the detergent mass into two streams.

2. A method according to claim 1 wherein the partition carries substantially cylindrical cone side surfaces.

3. A method according to claim 1 wherein the partition extends to the twin apertured extrusion plate and contacts the plate between the apertures.

4. A method according to claim 1 wherein each detergent stream passes through a second multi-apertured plate before passing through the twin-apertured extrusion plate.

5. A method according to claim 1 wherein the liquid contrasts in visual appearance with the detergent mass.

6. A method according to claim 1 wherein the extruded mass leaving the extrusion cone is cut into billets.

7. A method according to claim 6 wherein the billets are stamped to form detergent bars.

8. Detergent processing apparatus suitable for the injection of liquid in a detergent mass comprising:

a single screw extruder, a common extrusion cone into which the extruder opens, a twin apertured extrusion plate at the termination of the extrusion cone, apertured pressure plate means, carrying an unapertured area between two apertured areas, between the extruder and the extruder cone, liquid injection means positioned within or immediately downstream of each apertured area, and a partition extending downstream from the unapertured area, the side surfaces of the partition forming, together with the inner surfaces of the extrusion cone, separate compression means for each detergent stream.

9. Detergent processing apparatus according to claim 8 wherein the partition carries substantially cylindrical cone side surfaces.

10. Apparatus according to claim 8 wherein the partition extends to a twin apertured extrusion plate and contacts the plate between the apertures.

11. Apparatus according to claim 8 comprising a second apertured plate for each stream before the twin apertured extrusion plate.

* * * * *